United States Patent
Collins et al.

(10) Patent No.: US 12,465,321 B2
(45) Date of Patent: Nov. 11, 2025

(54) ULTRASOUND METHOD

(71) Applicants: Oxford University Innovation Limited, Oxford (GB); AUCKLAND UNISERVICES LIMITED, Auckland (NZ)

(72) Inventors: Sally Collins, Oxford (GB); Yi Yin, Oxford (GB); Alys Clark, Grafton (NZ); Padraig Looney, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 440 days.

(21) Appl. No.: 18/019,110

(22) PCT Filed: Aug. 7, 2020

(86) PCT No.: PCT/GB2020/051896
§ 371 (c)(1),
(2) Date: Feb. 1, 2023

(87) PCT Pub. No.: WO2022/029397
PCT Pub. Date: Feb. 10, 2022

(65) Prior Publication Data
US 2023/0277156 A1    Sep. 7, 2023

(51) Int. Cl.
*A61B 8/08*    (2006.01)

(52) U.S. Cl.
CPC .......... *A61B 8/0833* (2013.01); *A61B 8/0891* (2013.01)

(58) Field of Classification Search
CPC ....... A61B 8/0833; A61B 8/0891; A61B 8/06; A61B 8/0866; A61B 8/466; A61B 8/488; A61B 8/5207; A61B 8/5223; A61B 8/585; A61B 8/085; G06T 2207/10136; G06T 2207/20084; G06T 2207/30004; G06T 7/0012; G06T 7/11; G06T 7/155; G06T 7/187; G06T 2207/30104; G06N 3/045; G06N 3/08; G06N 3/0464
USPC ......................................................... 382/128
See application file for complete search history.

(56) References Cited

U.S. PATENT DOCUMENTS

2020/0134818 A1 * 4/2020 Hattori ................... G06T 7/62

FOREIGN PATENT DOCUMENTS

WO    WO-2012104577 A2 *  8/2012  .............. A61B 8/06
WO    2021/184075 A1       9/2021

OTHER PUBLICATIONS

International Search Report and Written Opinion for WO 2022/029397 (PCT/GB2020/051896), dated Mar. 29, 2021, pp. 1-18.

(Continued)

*Primary Examiner* — Neil R McLean
(74) *Attorney, Agent, or Firm* — Thomas|Horstemeyer, LLP

(57) ABSTRACT

A computer-implemented method of automatically identifying a reference vessel in an ultrasound image, the method comprising: segmenting the image to identify an organ; locating a predetermined anatomical landmark specific to the organ; identifying appropriate vasculature for the organ; and selecting a reference vessel from the vasculature that has a size within a predetermined size range and a location with a predetermined distance range from the predetermined interface.

17 Claims, 9 Drawing Sheets

(56) References Cited

OTHER PUBLICATIONS

Yin Yi et al: "Standardization of blood flow measurements by automated vascular analysis from power Doppler ultrasound scan", Progress in Biomedical Optics and Imaging, SPIE—International Society for Optical Engineering, Bellingham, WA, US, vol. 11314, Mar. 16, 2020 (Mar. 16, 2020), pp. 113144C-113144C.
Stevenson Gordon N. et al: "Automated Visualization and Quantification of Spiral Artery Blood Flow Entering the First-Trimester Placenta, Using 3-D Power Doppler Ultrasound", Ultrasound in Medicine and Biology, New York, NY, US, vol. 44, No. 3, Jan. 2, 2018 (Jan. 2, 2018), pp. 522-531.
Stevenson Gordon N. et al: "A Technique for the Estimation of Fractional Moving Blood Volume by Using Three-dimensional Power Doppler US", Radiology, vol. 274, No. 1, Jan. 1, 2015 (Jan. 1, 2015), pp. 230-237.
J. Rubin et al, "Normalizing fractional moving blood volume estimate with power Doppler US: Defining a stable intravascular point within the cumulative power distribution function. Radiology," vol. 205, pp. 757-765, 1997.
A. Welsh et al, "Inapplicability of fractional moving blood volume technique to standardize Virtual Organ Computer-aided Analysis indices for quantified threedimensional power Doppler.," Ultrasound Obstet Gynecol, vol. 40, pp. 688-692., 2012.
T. Jansson, E. Hernandez-Andrade, G. Lingman and K. Maršál, "Estimation of fractional moving blood volume in fetal lung using power Doppler ultrasound: Methodological aspects.," Ultrasound Med Biol, vol. 29, pp. 1551-1559, 2003.
N. A. Smith and P. J. Hunter, "An anatomically based model of transient coronary blood flow in the heart," SIAM Journal on Applied mathematics, vol. 62(3), pp. 990-1018, 2002.
P. Looney, G. N. Stevenson, K. H. Nicholaides, W. Plasencius, S. Natsis and S. L. Collins, "Fully automated, real-time 3D ultrasound segmentation to estimate first trimester placental volume using deep learning," JCI insights 2018;3: e120178.
G. N. Stevenson , S. L. Collins, J. Ding, L. Impey and J. A. Noble, "3-D Ultrasound Segmentation of the Placenta Using the Random Walker Algorithm: Reliability and Agreement," Ultrasound Med Biol, vols. 3182-3193, p. 41, 2015.

O. Ronneberger, F. P and T. Brox, "U-Net: Convolutional Networks for Biomedical Image Segmentation," in International Conference on Medical Image Computing and Computer-Assisted Intervention, 2015.
A. W. Welsh, J. B. Fowlkes, S. Z. Pinter and et al, "Three-dimensional US Fractional Moving Blood Volume: Validation of Renal Perfusion Quantification," Radiology, vol. 293, pp. 460-468, 2019.
S. L. Collins, G. N. Stevenson, J. A. Noble and L. Impey, "Uteroplacental interface vascularity in early pregnancy estimated by 3D fractional moving blood volume (3D FMBV) predicts fetal growth restriction," Ultrasound Obstet Gynecol, vol. 40, p. 119, 2012.
T. C. Lee, R. L. Kashyap and C. N. Chu, "Building Skeleton Models via 3-D Medial Surface Axis Thinning Algorithms. CVGIP: Graphical Models and Image Processing," vol. 56, pp. 462-478, 1994.
A. Videla, C.-L. Lin and J. D. Miller, "Watershed Functions Applied to a 3D Image Segmentation Problem for the Analysis of Packed Particle Beds," Particle & Particle Systems Characterization, vol. 23, pp. 237-245, 2006.
Z. Wangmeng et al, "Combination of polar edge detection and active contour model for automated tongue segmentation," Third International Conference on Image and Graphics (ICIG'04), 2004.
C. I. Collewet, "Polar snakes: A fast and robust parametric active contour mode," 2009 16th IEEE International Conference on Image Processing (ICIP), 2009.
T. F. Chan and L. A. Vese, "Active contours without edges," IEEE Transactions on Image Processing, vol. 10(2):, pp. 266-277, 2001.
J. M. Rubin, R. S. Adler and J. B. Fowlkes et al, "Fractional moving blood volume: estimation with power Doppler," US. Radiology, vol. 197, pp. 183-190., 1995.
P.-L. Yen, H.-K. Wu and H.-S. Tseng et al, "Vascular morphologic information of three-dimensional power Doppler ultrasound is valuable in the classification of breast lesions," Clinical Imaging, vol. 36, pp. 267-271, 2012.
P. Looney, G. N. Stevenson and S. L. Collins, "3D ultrasound file reading and coordinate transformations," Journal of Open Source Software, vol. 4, p. 1063, 2019.
F. Sur, "An a-contrario approach to quasi-periodic noise removal," 2015 IEEE International Conference on Image Processing (ICIP), 2015.

* cited by examiner

Fig. 2
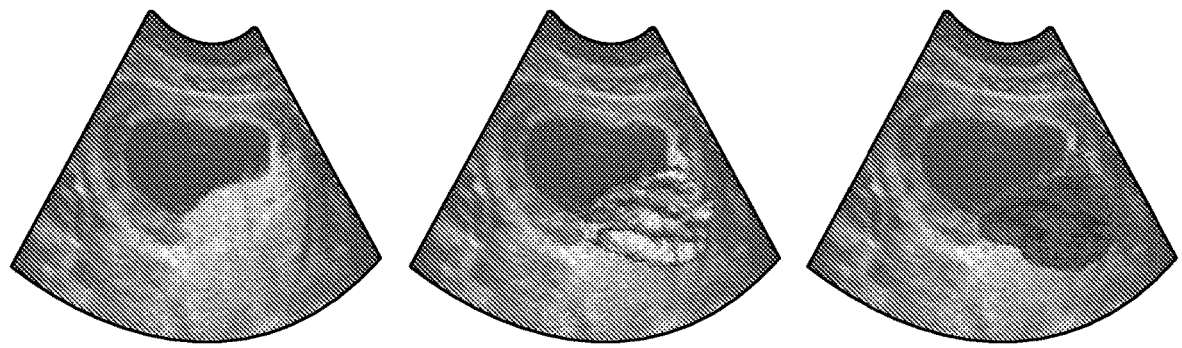
Fig. 6(a)
Skeletonization
Fig. 6(b)
Vessel Volume Division
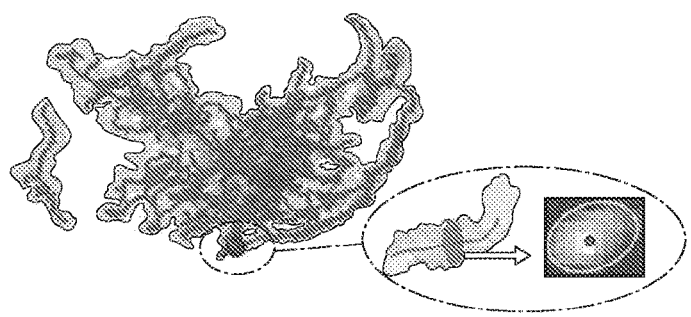
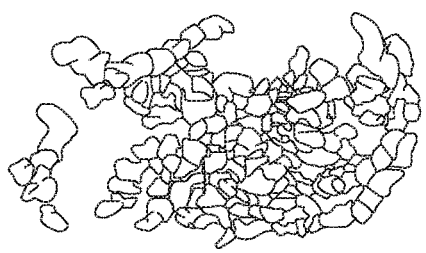

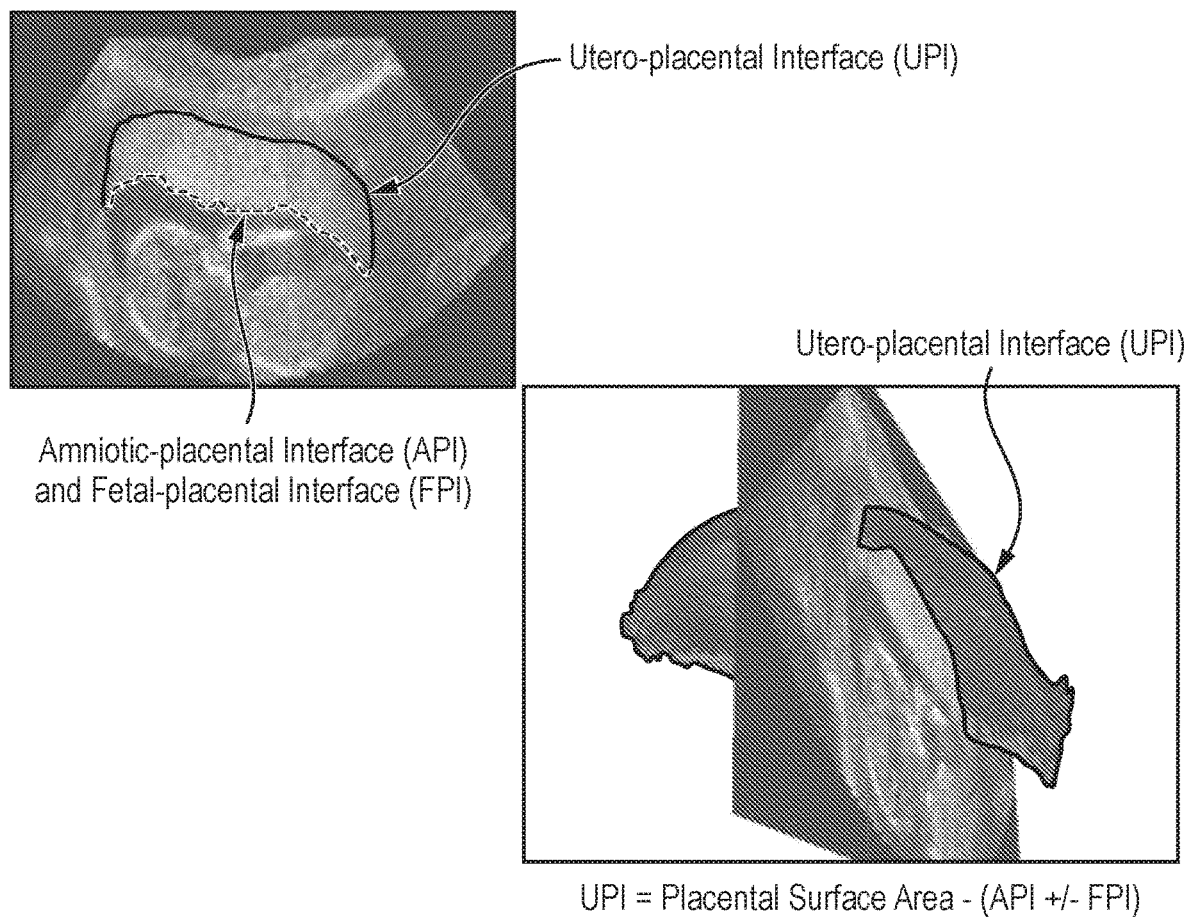

Kernal: (3,3,3)

ULTRASOUND METHOD

GOVERNMENT SUPPORT CLAUSE

This invention was made with government support under U01 HD087209 awarded by the National Institutes of Health. The government has certain rights in the invention.

CROSS-REFERENCE TO RELATED APPLICATIONS

This application is the National Stage of International Application No. PCT/GB2020/051896, filed Aug. 7, 2020, which is entirely incorporated herein by reference.

FIELD

The present invention relates to ultrasound imaging and measurement, in particular using power Doppler ultrasound techniques to measure blood flow.

BACKGROUND

Power Doppler ultrasound is a technique that uses the amplitude of reflected signals as a function of frequency shift relative to the emitted signal to determine movement of tissue in a subject, in particular blood flow. Power Doppler (PD) ultrasound is quantified by integrating the amplitudes of ultrasound scattering within an area (2D-PD) or volume (3D-PD) of interest. This is achieved by summing the power Doppler signal within the region of interest, with this PD signal representing the local concentration of red blood cells (which scatter ultrasound). Generally, power Doppler ultrasound can only provide information about relative blood flow since the amount of attenuation of the returned echo between the measurement site and the sensor is unknown. The attenuation depends on the distance between the measurement site and the sensor as well as the nature of the intervening tissue, for example scar tissue is strongly attenuating. Knowledge of absolute blood flows would improve diagnosis of various conditions. A known technique for standardisation of the power Doppler signal involves manual identification of a region of interest to act as a standardisation reference from which a normalisation point is determined. The normalisation point used is a "knee value" with power Doppler intensity values above the normalisation point being assigned value 1 and values below it scaled to the range 0 to 1 [1].

SUMMARY

A technique to enable an absolute measurement of blood flow is desirable.

According to the invention there is provided a computer-implemented method of automatically identifying a reference vessel in an ultrasound image, the method comprising:
  segmenting the image to identify an organ;
  locating a predetermined anatomical landmark specific to the organ;
  identifying appropriate vasculature for the organ; and
  selecting a reference vessel from the vasculature that has a size within a predetermined size range and a location with a predetermined distance range from the predetermined anatomical landmark.

Desirably the predetermined size range is greater than 3 mm in diameter.

Desirably segmenting comprises using a trained fully convolutional neural network.

Desirably locating comprises using a multi-class transfer learning model.

Desirably the multi-class transfer learning model comprises two independent pathways, a first pathway having parameters initialised using a segmentation model and a second pathway having parameters initialised using variance scaling.

Desirably identifying comprises using an automated multi-seed region growing based process.

Desirably identifying further comprises using a 3D medial axis based thinning process on the output of the growing based process.

Desirably the organ is the placenta and preferably the anatomical landmark is the utero-placental interface. In this case, desirably the predetermined distance range is from about 0.5 cm to about 1.5 cm.

According to the invention there is provided a computer-implemented method of mapping blood flow in a power Doppler image of an organ, the method comprising:
  identifying a reference vessel in the power Doppler image using the method described above;
  determining a reference power Doppler value from the reference vessel; and
  scaling power Doppler values in the power Doppler image based on the reference power Doppler value to obtain a standardised image of blood flow.

Desirably determining a reference power Doppler value comprises fitting a model vessel profile to the reference vessel and determining a standardization point not falling within the high shear vessel margins.

Desirably fitting a model vessel profile comprises detecting a local maximum intensity point and using a region growing method to obtain an initial vessel region where all the interior intensities are greater than a threshold.

Desirably an iterative gradient descent technique is applied to minimize a cost function.

According to the invention there is provided a computer-implemented method of determining fractional moving blood volume in an organ, the method comprising:
  obtaining a power Doppler image of the organ;
  mapping blood flow in the power Doppler image to obtain a standardised image of blood flow using the method described above; and
  determining fractional moving blood volume using the standardised image of blood flow.

According to the invention there is provided a computer-implemented method of calculating a risk of adverse pregnancy outcomes, for example fetal growth restriction and/or pre-eclampsia comprising:
  determining fractional moving blood volume in the placenta of a subject according to the method described above;
  measuring placental volume of the subject; and
  calculating a risk score based at least in part on the fractional moving blood volume and the placental volume.

The present invention therefore enables fully automated comparisons of quantitative blood flow estimates between different patients with different tissue attenuation by normalising the absolute signal such that the integral of the signal over the region of interest is consistently baselined. To do this, a large vessel with '100% vascularity', is identified at a similar level of tissue depth to the region of interest, and the numerical value recorded for the PD signal in that vessel used as a 'standardisation point' [2]. If the PD signal throughout the region of interest is divided by the signal in that large vessel, then other smaller vessels in that region of interest will consistently have the same proportional signal intensity in relation to the 100% vascularity vessel. This standardisation process produces a measure known as Fractional Moving Blood Volume (FMBV) which is the only validated method for quantitatively measuring perfusion with ultrasound both in 2D and 3D.

The present invention provides a novel method for FMBV estimation, which overcomes the limits of prior art techniques and can increase the accuracy of the technique. For example, the present invention avoids difficulties resulting from definition of the region of interest for analysis, where normalisation values are a function of the size of the region of interest as well as the nature of the tissue included within it. In addition the technique of the present invention is less susceptible to the signal to noise ratio in the acquired images; in many cases the sensitivity to noise is extremely low. Further, the present invention is not susceptible to the influence of moderately sized vessels within the region of interest on the location of 'knee points' and subsequently calculated standardisation values.

The present invention can enable automatic identification of a power Doppler standardization value from a single vessel to adjust for tissue attenuation of the ultrasound signal. Embodiments of the present invention provide a robust and efficient method to automatically identify a power Doppler standardization value from a single vessel extracted from a complex vascular network imaged by standard 3D power Doppler Ultrasound.

BRIEF DESCRIPTION OF THE DRAWINGS

The invention will be described further below with reference to exemplary embodiments and the accompanying drawings, in which:

FIG. 2 depicts example images of placental segmentation with 2D B-mode plane (left), semi-automated Random-Walker segmentation (centre) and segmentation using the fCNN of FIG. 1 (right);

FIG. 4 depicts how the utero-placental interface (UPI) can be identified once the amniotic-placental interface (API) and fetal-placental interface (FPI) are known;

FIG. 6a depicts skeletonisation of the vascular tree and an example of a vessel centreline showing a cross-section profile and FIG. 6b depicts the vascular tree with separated vessel segments;

In the various drawings, like parts are indicated by like references.

EXEMPLARY EMBODIMENTS

Figure 1:
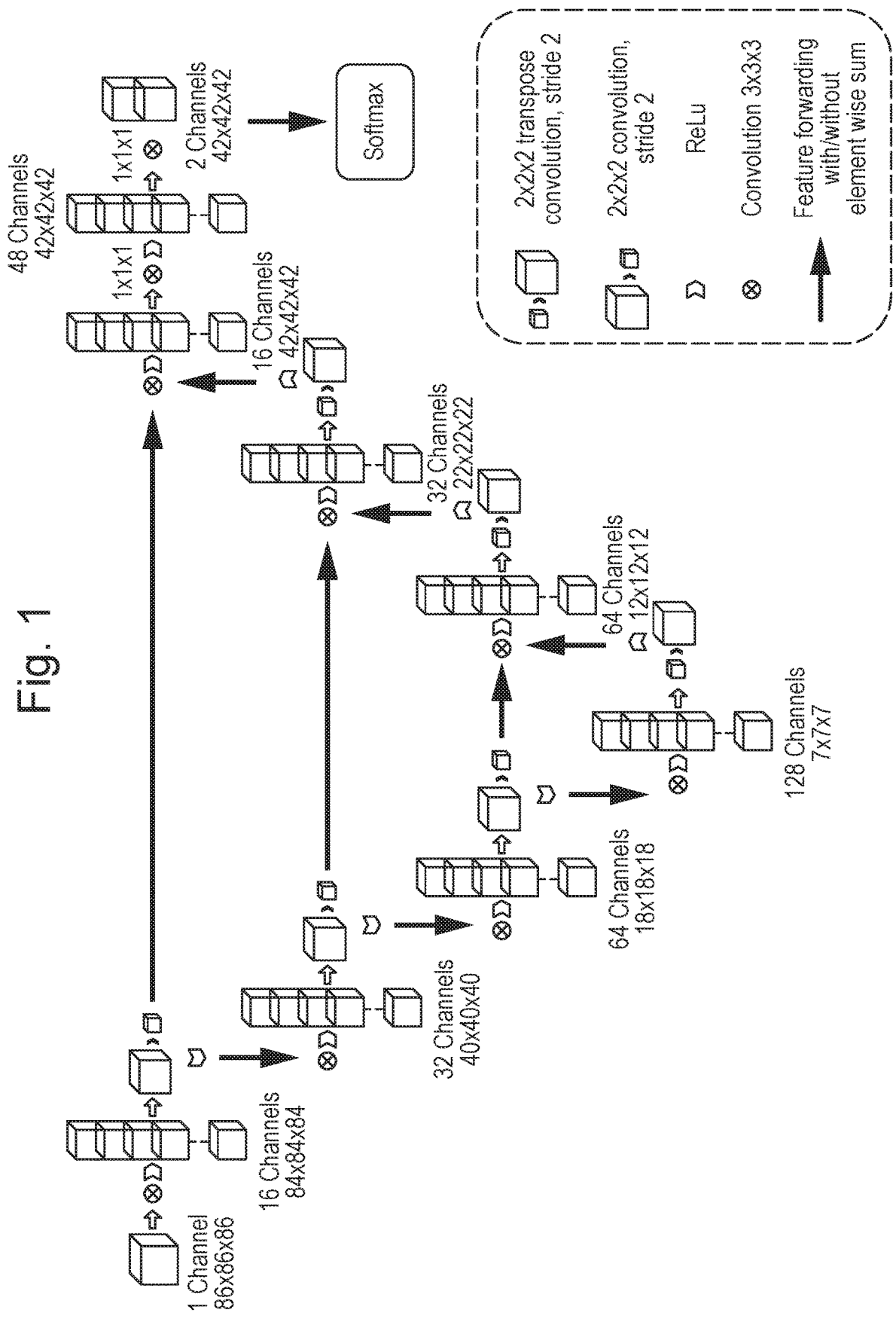
FIG. 1 depicts the architecture of a fully convolutional neural network (fCNN) that can be used in embodiments of the invention.

Theory: Power Doppler Signal Profile of Blood Vessel
Jannson et al. showed that in a phantom model containing scattering particles, the Doppler power was proportional to velocity over a range of power, which they concluded was likely to be the case for a range of machines and settings [3]. In any elliptical cross-section of a vessel we would expect the flow speed, or intensity, I, profile to have the following shape $$I(x, y) = I_{max}\left[1 - \left(\frac{x^2}{a^2} + \frac{y^2}{b^2}\right)^{\frac{\gamma}{2}}\right] \quad (1)$$

where a and b are major and minor axis radii of the cross-section of the vessel, x and y are cartesian coordinates defining the major and minor axes of the vessel, $I_{max}$ is the true (noiseless) maximum intensity within the vessel, and $\gamma$ is a parameter that works to 'flatten' the velocity profile, $\gamma=2$ represents a classic Poiseuille flow profile in a pipe with ellipsoidal cross-section and increasing $\gamma>2$ allows for the flattening of the profile due to the pulsatile nature of flow (particularly in large arteries) [4].

The greatest risk factor for stillbirth is fetal growth restriction (FGR), usually secondary to sub-optimal placental implantation. Unfortunately, the methods currently available to assign risk of FGR perform very badly and many women deemed 'low-risk' are unaware that their baby is not growing appropriately until they present with a stillbirth. If stratified as 'high-risk' women will receive serial growth ultrasound scans in order to identify the babies failing to thrive with the aim of delivering them before a stillbirth occurs. The current risk assessment method performs so badly that many supposedly 'high-risk' women deliver well-grown, healthy babies after a pregnancy riddled with unnecessary stress and anxiety.

A robust and reliable first trimester screening method to assess the risk of FGR is desperately needed. This would mean the women actually at high-risk of stillbirth secondary to FGR would receive the available serial growth ultrasound scans.

First Trimester Screening Test
First trimester placental volume (PlVol) has long been known to correlate with birthweight at term and it was suggested as early as 1981 that PlVol measured with B-mode ultrasound could be used to screen for FGR. Since then many studies have demonstrated that a low PlVol between 11 and 13 weeks' gestation can predict adverse pregnancy outcomes including small for gestational age (SGA—a surrogate marker for FGR) and pre-eclampsia. As PlVol has also been demonstrated to be independent of other biomarkers such as pregnancy associated plasma protein A (PAPP-A) and nuchal translucency (NT) a recent systematic review concluded that it could be successfully integrated into a future multivariable screening method for FGR analogous to the 'combined test' currently used to screen for fetal aneuploidy (including Down's Syndrome) in the first trimester. Early pilot data has also demonstrated that combination of PlVol with estimates of placental perfusion may be able to differentiate between different adverse pregnancy outcomes, with a low PlVol but normal vascularity being associated with increased risk of FGR whilst a low PlVol and hypovascularity increases the risk of developing preeclampsia.

Whilst there is solid background data supporting their value, for PlVol and placental vascularity to become useful imaging biomarkers, a reliable, real-time, operator-independent technique for their estimation is needed.

Until now, the only way to estimate PlVol was by annotating the placenta within a three-dimensional ultrasound (3D-US) either manually (drawing around the placenta in every 2D slice making up the 3D volume) or using semi-automated tools such as the VOCAL™ (GE, USA). VOCAL™ requires the operator to 'draw' around the placenta in several, but not all, of the 2D slices, then uses a rotational interpolation algorithm to estimate the final volume. Both of these strategies are far too time consuming and operator-dependent to be useful as part of a population-based screening test and neither are able provide any other morphological metrics such as shape or surface area. There also remains significant debate about the repeatability and reproducibility of volume results produced by VOCAL™ based upon the number of outlines used (degree of interpolation) and the variability of the organ of interest.

There is no product currently available which enables automatic measurement of validated vascular metrics such as fractional moving blood volume (FMBV).

The present inventors have developed and validated a novel fully convolutional neural network (OxNNet) [5] can automatically identify the placental volume from a 3D-US. As discussed further below, the present invention provides further developments to enable automatic identification of relevant anatomical landmarks to facilitate fully automated vascular metrics.

To develop OxNNet, the placenta was segmented from 2393 first trimester 3D-US volumes using the gold-standard, semi-automated Random-Walker technique [6]. This was quality controlled by three operators to produce the 'ground-truth' dataset. A fully convolutional neural network (fCNN) called OxNNet, was created using the framework TensorFlow (v1.3) and a 3D architecture inspired by a 2D U-net [7] (see FIG. 1). The effect of training set size on the performance of the model was investigated by using samples of 100, 150, 300, 600, 900 and 1200 cases trained for 25,000 iterations throughout.

To evaluate the PlVol segmentation, 2-fold cross-validation was performed using 1097 placentas as the training set with 100 validation images. OxNNet was trained for 8 epochs and took 26 hours to run. It was then tested on 1196 cases. Final computation of a PlVol following training took on average 11 seconds.

Each predicted segmentation was post-processed to remove disconnected parts of <40% of the volume of the largest region. The segmentation was binary dilated and eroded using a 3D kernel of radius three voxels and a hole filling filter applied. These methods smoothed the boundary of the placenta and filled any holes that were surrounded by placental tissue (cystic lesions occur in normal placentae and should be included in any estimation of PlVol).

Figure 3:
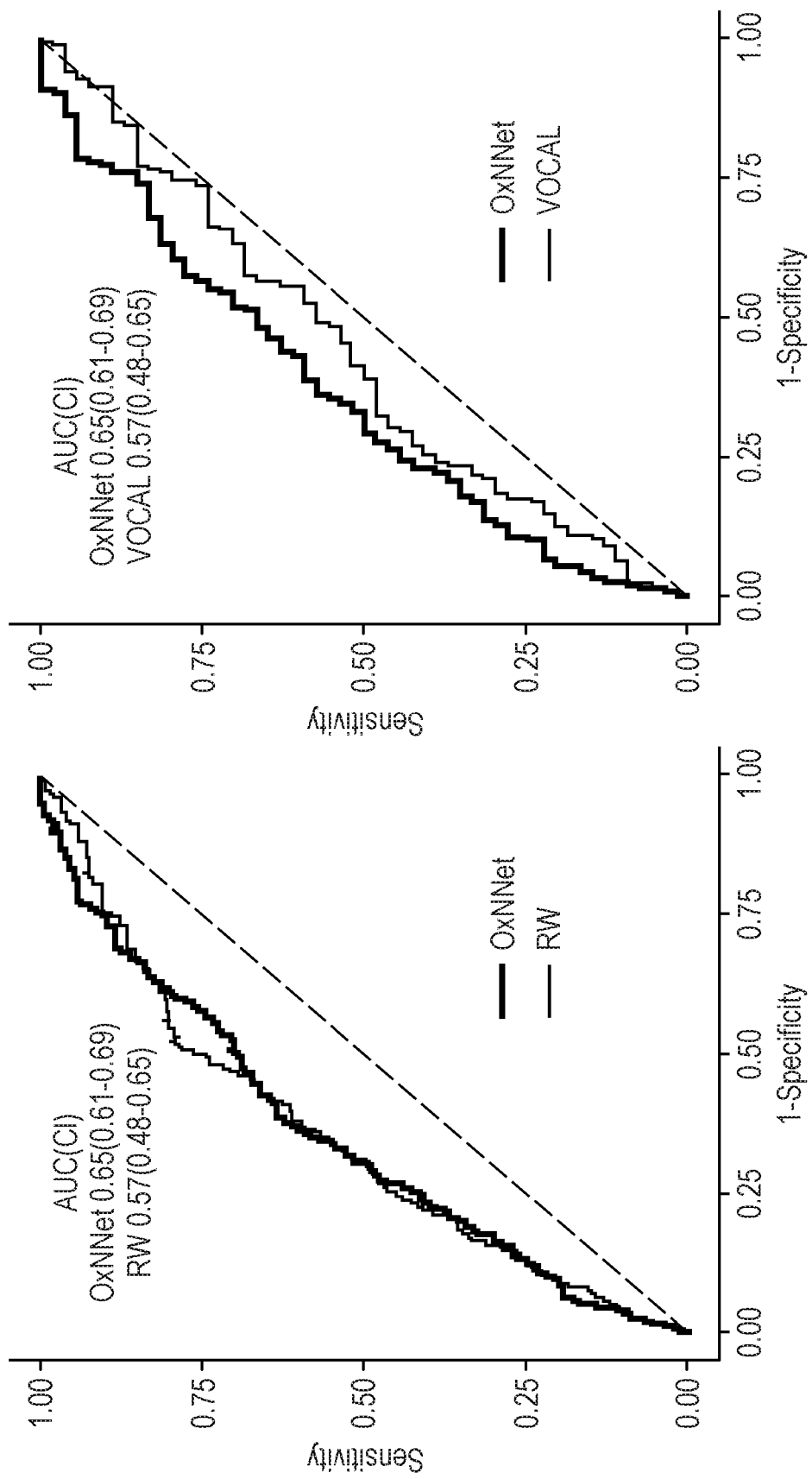
FIGS. 3a and 3b are graphs comparing placental volumes calculated by the fCNN of FIG. 1 and, respectively, the semi-automated Random-Walker technique and the commercially available VOCAL™ technique.

OxNNet delivered state of the art fully automatic segmentation (median Dice similarity coefficient (DSC) of 0.84: See FIG. 2) when compared to the 'ground truth' dataset. The effect of training set size on the performance of OxNNet demonstrated the need for large datasets (n>1000). This is important as most imaging tools generated with machine learning to date have used considerably smaller datasets. The clinical utility of the PlVol estimates produced by OxNNet was tested by looking at the prediction of small-for-gestational-age (SGA) babies (a surrogate marker for FGR). The receiver-operating characteristics curves demonstrated almost identical results for the prediction of SGA babies for the PlVol estimates produced by OxNNet (AUC 0.65 (95% CI; 0.61-0.69) and the 'ground-truth' generated by the semi-automated Random-Walker technique (AUC 0.65 (95% CI; 0.61-0.69): See FIG. 3a). OxNNet outperformed the only commercially available tool, VOCAL™ (AUC 0.57 (95% CI; 0.48-0.65: See FIG. 3b).

The present invention proposes, in order to examine the vascularity of the placental bed, to identify the utero-placental interface (UPI) as an anatomical reference point (see FIG. 4). OxNNet can successfully segment the whole placenta but the present invention proposes to separate the 2 different placental surfaces; the UPI—where the placenta is implanted into the uterus—and the amniotic-placental interface (API)—where the placenta is in contact with the amniotic fluid (which fills the sac containing the fetus; see FIG. 4). Occasionally the fetus lies touching the placenta so the feto-placenta interface (FPI) must also be identified and included with the API.

An embodiment of the invention uses machine learning to develop a robust multiclass segmentation technique to identify the placenta, fetus and amniotic fluid from a B mode 3D ultrasound scan thereby facilitating automatic anatomical landmark identification.

From the available 2,393 3D-US volumes with an existing placental segmentation, 300 volumes were randomly selected for multiclass segmentation. The amniotic fluid and the fetus were manually seeded by two operators and combined with the placental seeding performed from the previous study. The amniotic fluid and fetus have more distinct boundaries than the placenta so initialisation was much easier but any cases where there was ambiguity were examined by a clinical expert with extensive experience in obstetric ultrasound. These three different classes were then segmented as a multi-class label map using the gold standard, Random Walker algorithm.

Figure 5A:
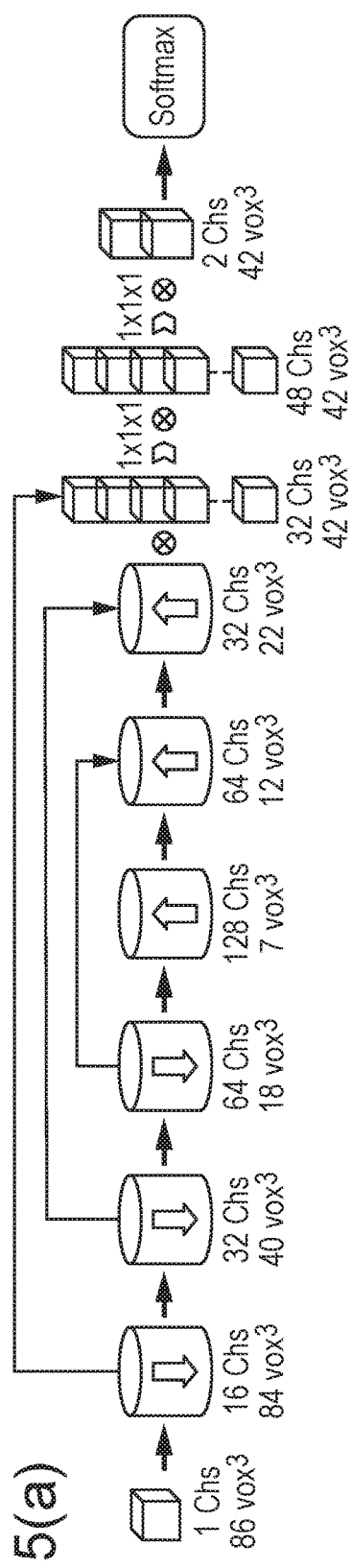
FIGS. 5a to c depict the fully convolutional neural network architecture of models used in an embodiment of the invention, specifically (a) placenta segmentation (PS) model; (b) hybrid (HB) model; and (c) description of symbols.

The 300 multi-class (MC) cases were sub-divided into 200 train cases, 40 validation cases and 60 test cases. Four MC models were each trained for 40 epochs with a batch size of 30. Firstly, a MC model was trained using a fCNN with identical architecture to the original OxNNet (see FIG. 5a). Then, a multi-class transfer learning (MCTL) model was trained using the same architecture but with the weights and biases taken from the original OxNNet training (effectively 'transferring' what OxNNet had 'learned' from a much larger training dataset of 1097 cases compared to the 200 cases of the simple MC model).

Figure 5B:
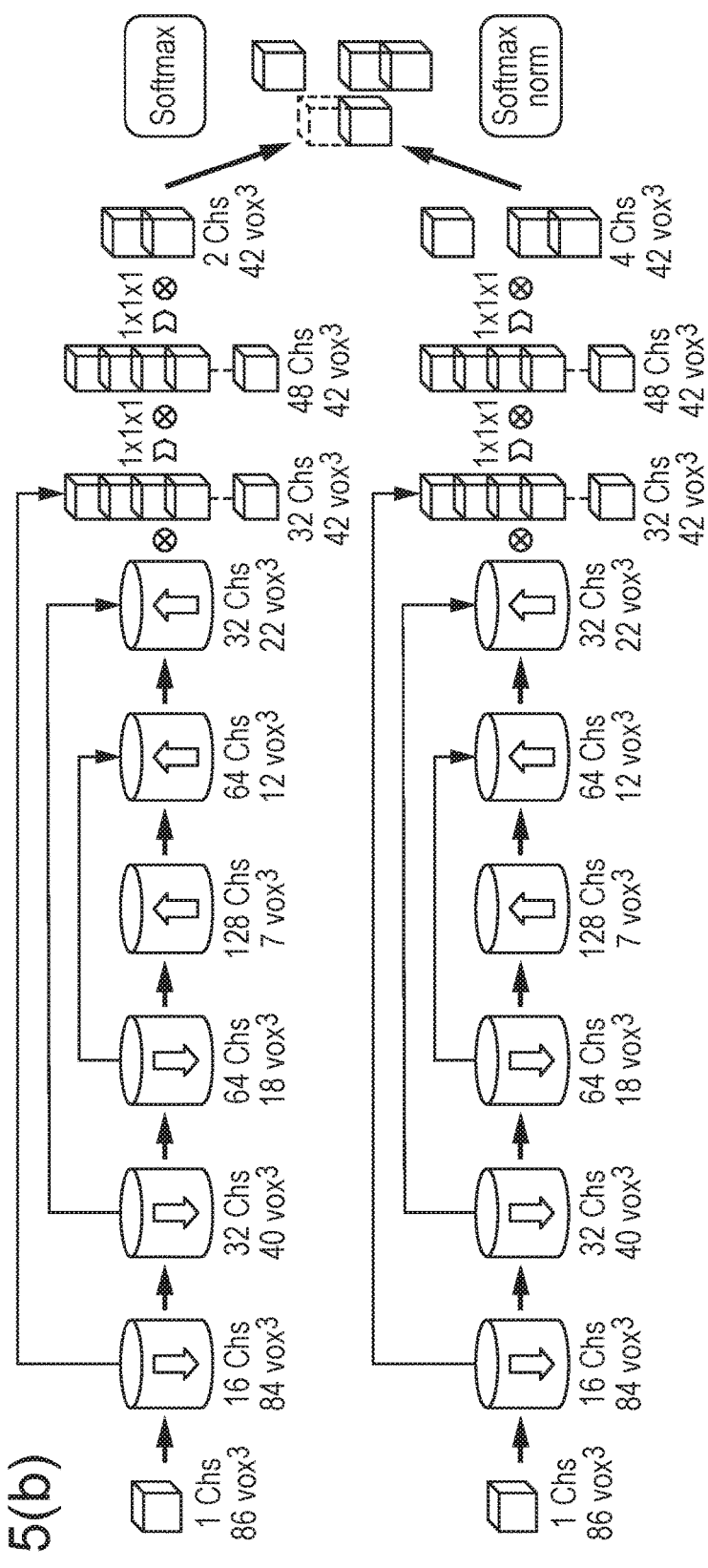
Figure 5C:
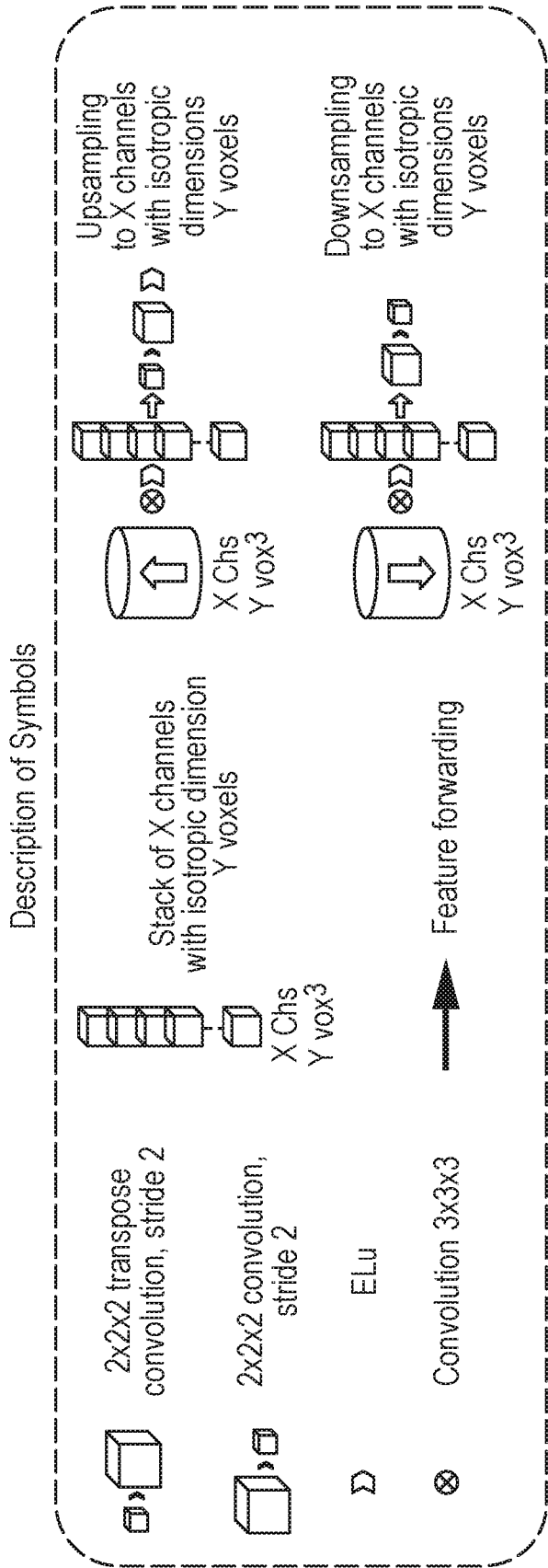

To overcome any potential reduction in performance on the other two targets (fetus and amniotic fluid) two hybrid models were developed, the hybrid model (HB) and hybrid model with exponential averaging (HBAV). Exponential moving average reduces noise by averaging the weights of the model over the training process and favouring more recent values of the weights as well as providing computational efficiency since it does not require the storage of all the weights. Both hybrid models consisted of two independent pathways which were created as shown in FIG. 5b. The architectures of the multi-class (MC) and multi-class transfer learning (MCTL) models are not shown here as they only differ to the placental segmentation (PS) model architecture by having four channels instead of two.

The hybrid model (HB) and hybrid model with exponential averaging (HBAV) both consisted of two independent pathways as shown in FIG. 5b. In the top pathway, the HB parameters were initialised using the PS model and were initialised using the PSAV model for the HBAV model. In the bottom layer, the parameters were initialised using variance scaling and then trained on the MC data. Parameters in the bottom pathway were allowed to change and fixed in the top pathway for both HB and HBAV models. The parameters of the Adam optimizer were identical to those used in the PS training.

Let $P_{Background}$, $P_{Placenta}$, $P_{Amniotic}$ and $P_{Fetus}$, be the confidences that a voxel belongs to the background placenta, amniotic fluid and fetus respectively. For a given voxel i, the softmax output of the top pathway (T) was given as only two values $P_{Background}^T$ and $P_{Placenta}^T$ that summed to 1. In this case, the fetus and amniotic fluid were included in the background. In the bottom (B) pathway, the softmax of the final layer produced a confidence for membership of a given voxel with scalar values of $P_{Background}^B$, $P_{Placenta}^B$, $P_{Amniotic}^B$ and $P_{Fetus}^B$, that summed to 1. The $P_{Background}^B$ indicated the confidence that a voxel is neither placenta, fetus or amniotic fluid. The loss function, L was defined combining the outputs of two pathways as $$L = \Sigma_{i \in M} m_i \times sl(o_i / n_i) \quad (2)$$

where M is a binary mask whose value $m_i$ was 0 for a voxel i within the placental ground truth region and 1 outside this region, $o_i$ was the output of the bottom pathway, sl was the softmax cross entropy function and $n_i$ was the normalisation factor defined as 1 minus the output from softmax layer of the top pathway.

Since the loss function is masked over the placenta region there is no contribution of the placenta in the training of the model. The final confidence vector in the HB model has scalar components given by:

$$P_{Background}^{HB} = P_{Background}^T \times \left( \frac{P_{Background}^B}{1 - P_{Placenta}^B} \right) \quad (3)$$

$$P_{Placenta}^{HB} = P_{Placenta}^T \quad (4)$$

$$P_{Amniotic}^{HB} = P_{Background}^T \times \left( \frac{P_{Amniotic}^B}{1 - P_{Placenta}^B} \right) \quad (5)$$

$$P_{Fetus}^{HB} = P_{Background}^T \times \left( \frac{P_{Fetus}^B}{1 - P_{Placenta}^B} \right) \quad (6)$$

where the final segmentation of a voxel is taken as the maximum value of the values defined in Equations (3) to (6). Hence, the placental segmentation of the HB model will be identical to the PS model for all voxels where $P_{Placenta}^{HB} > 0.5$. Voxels where $0.25 < P_{Placenta}^{HB} < 0.5$ were classified as placenta by the HB model but classified as background by the PS model if the remaining classes, $P_{Background}^{HB}$, $P_{Amniotic}^{HB}$ and $P_{Fetus}^{HB}$, each have values $< P_{Placenta}^{HB}$.

The parameters of the optimizer were identical to those used in the original OxNNet training. All four models provided useful results, albeit the hybrid model with exponential averaging was best. With these models, all possible placental morphometrics relating to the anatomical landmarks, such as the site and surface area of the UPI, can be automatically identified. This makes the mapping the vascularity of the placental bed possible thereby improving the predictive potential for adverse pregnancy outcomes such as pre-eclampsia.

Having identified the utero-placental interface (UPI), the next step is to assess blood flow in the placenta.

Doppler ultrasound is known as the primary non-invasive imaging modality performed in pregnancy to assess the blood flow within placenta and fetal organs. Power Doppler (PD) ultrasound is less affected by the angle of insonation than colour Doppler and is sensitive to multiple directions of flow and low flow velocities, therefore it is more useful to assess tissue perfusion. However, like all forms of ultrasound, PD ultrasound signal is attenuated by the tissue which it passes through. To compensate for the attenuation and permit the direct inter-patient comparison, it is necessary to standardize the power Doppler signal. The only validated method for estimating tissue perfusion from PD ultrasound is fractional moving blood volume (FMBV). This has recently been validated in 3D against the gold-standard of radioactive in a porcine model microspheres [8]. Using 3D-FMBV, the inventors have demonstrated in a small pilot study (n=143) that the perfusion of the first trimester placental bed was significantly reduced for pregnancies developing preeclampsia (p=0.03) but not reduced in normotensive pregnancies resulting in small for gestational age (SGA) babies (p=0.16) [9]. This agrees with the classic histopathological findings in pre-eclampsia of poor spiral artery adaptation.

To standardize the power Doppler signal in order to determine 3D-FMBV it is proposed to identify a large reference vessel close to the target of interest which can be assumed to have 100% vascularity. The PD signal within the reference vessel is then used to define a standardization value which corrects the PD signal values recorded in the target thereby adjusting for the individual signal attenuation and permitting appropriate inter-patient comparison. The present invention aims to fully automate estimation of 3D-FMBV and thereby facilitate large scale testing of this finding and potentially improve the predictive ability of the first trimester screening test. The present invention can also be applied to measurement of vascularity of other organs and/or tumours, in particular using transfer learning to minimise the training needed on other organs or tumours.

A fully automated technique for mapping and measuring the utero-placental vasculature from a 3D-PD ultrasound scan which has had the anatomical landmarks automatically identified as described above is now described. This moves away from defining regions of interest that may differ between studies and focuses on identifying a consistent automatically identifiable large vessel for normalisation. In addition, as the procedure identifies and analyses a single blood-filled vessel for normalisation it provides an algorithm that is highly consistent across a range of signal to noise ratios typical of power Doppler, and does not suffer from variability in normalisation due to the presence of a perfused parenchyma or moderate sized blood vessels in the surrounding region of interest.

First, an automated multi-seed region growing based method was used to extract the whole uterine vasculature. This method was chosen as it is superior to the commonly used thresholding as it can maintain representation of vessel connections. A 3D medial axis based thinning method [10] was then adopted to extract the myometrial vascular plexus skeleton (see FIG. 6a). The vessel skeleton was then further separated into a number of segments by removing the bifurcated points. A 3D watershed algorithm [11] was applied using these central line segments as markers to divide the vascular network into vessel segments (FIG. 6b). The local vessel cross-section, an intersection between the vessel segment's volume and a plane perpendicular to the local vessel central line, was drawn for each segment to find the vessel diameter (FIG. 6a). The vessel segments showing single peak of intensities in the cross-sections are identified as individual vessels to be considered as candidates of a reference vessel. The reference vessel chosen is the one with largest diameter >3 mm which is located within the volume of interest. Alternatively, any individual vessel having a diameter greater than a pre-specified threshold, e.g. 3 mm, can be chosen.

By combining this vascular identification technique with the greyscale OxNNet tool which can identify the anatomical landmarks in the placenta including the UPI, an appropriate reference vessel in the placenta bed, at a pre-defined distance from the UPI, can be chosen. The predefined distance may be about 1 cm, e.g. between 0.5 cm and 1.5 cm. If there are multiple vessels meeting the criteria, the largest can be chosen. Using this reference vessel, a fully automated estimation of the 3D-FMBV (perfusion) of the entire UPI, or any volume of interest relative to the UPI, can then be calculated using the new method.

Estimation of 3D-FMBV using a vessel which is known to have 100% vascularity is a way of standardizing the numerical value of the power Doppler signal which is affected by tissue attenuation. Performing such standardization makes quantitative inter-patient comparisons possible as it corrects for the depth of the target organ and type of tissue being insonated (e.g. corrects for amount of adiposity).

Calculation of the standardization value is independent of the vessel size above 3 mm and adaptive to vessel intensity profile shapes. It has been demonstrated to be precise by comparison with synthetic data. There is currently no technique which produces a standardisation point from a single vessel either manually or automatically.

In embodiments, the standardization point is decided by the automatic identification of the high shear vessel margins of an individual blood vessel based on the vessel features (intensity profile and diameter) and a fluid mechanics simulation, which indicates a 'constant' value of blood flow velocity. A shear threshold may be applied. This enables a precise estimate of the numerical standardisation value to be made each time. This is described in more detail below.

Locating the Vessel Boundaries

The blood vessel boundary in PD ultrasound images is observed to have low intensity (close to background intensity) and thus has low contrast. As an easily operated method, thresholding is commonly used to segment blood vessels. However, due to the low contrast boundary and unavoidable noise induced during imaging, simply thresholding will not provide accurate vessel segmentation. Polar active contour methods have been shown to perform well in boundary detection of other forms of object with generally convex shape [12][13][14]. The present invention proposes to use a similar method for vessel segmentation to achieve a robust and highly accurate vessel segmentation.

Active contours deform the object boundary to minimize a defined energy functional in order to obtain the segmentation of the object [14]. Let S be a given image, which contains the object blood vessel, defined in the domain $\Omega$, and C={$\chi|\phi(\chi)=0$} be a closed contour. $\phi$ is a signed distance function. The interior of C (candidate vessel region) is defined by an approximation of the smoothed Heaviside function:

$$\mathcal{H}_{\phi(\chi)} = \begin{cases} 1, & \phi(\chi) < -\epsilon \\ \frac{1}{2}\left\{1 + \frac{\phi}{\epsilon} + \frac{1}{\pi}\sin\left(\frac{\pi\phi(\chi)}{\epsilon}\right)\right\}, & |\phi(\chi)| \le \epsilon \\ 0, & \phi(\chi) > \epsilon \end{cases} \quad (7)$$

The exterior of C, the region outside of the target vessel is defined as $1 - \mathcal{H}_{\phi(\chi)}$. Let E(C) be the energy function. The expected vessel boundary is the contour C that minimizes the energy function.

In the polar system, the contour samples the boundary at a number of angles. Then the polar contour evolves only radially. To describe the energy in the polar system, we defined a characteristic function $$\mathcal{L}(\chi, p) = \begin{cases} 1, & \theta(p) = \theta(\chi) \\ 0, & \text{otherwise} \end{cases} \quad (8)$$

where the vessel center is regarded as the pole, $\chi$ and p are two points and $\theta(\cdot)$ is the angular coordinate of a point in polar coordinate system. The function $\mathcal{L}(\chi, \rho)$ is 1 only when $\rho$ is on the same radial line as $\chi$.

The energy function is then expressed as $$E(\phi) = \int_{\Omega_\chi} \delta\phi(\chi) \int_{\Omega_\rho} \mathcal{L}(\chi,\rho) \cdot \mathcal{F}_{(\phi(\rho))} d\rho d\chi \quad (9)$$

where $\delta\phi(\chi)$ is the derivative of $\mathcal{H}_{\phi(\chi)}$. $\mathcal{F}$ predicts for each contour point, the local intensity adherence (radial) to an optimal intensity model at that point. According to equation (1), the vessel radial intensity profile is $$I(\rho) = I_{max}\left[1 - \left(\frac{\rho}{\lambda}\right)^{\frac{\gamma}{2}}\right] \quad (10)$$

Note that for the detection of uterine blood vessels, which are small in size and are observed to have a parabolic intensity profile, $\gamma$ is set to 2. By fitting equation (10) to the radial intensities inside the vessel contour point $\chi$, we obtained the estimated interior intensity $$\hat{I}_\chi(\rho) = I_{max,\chi}\left[1 - \left(\frac{\rho}{\lambda_\chi}\right)^{\frac{\gamma}{2}}\right] \quad (11)$$

The exterior mean intensity is calculated as $$\upsilon_\chi = \frac{\int_{\Omega_p} \mathcal{L}(\chi, p) \cdot (1 - \mathcal{H}_{\phi(p)}) \cdot I(p) dp}{\int_{\Omega_p} \mathcal{L}(\chi, p) \cdot (1 - \mathcal{H}_{\phi(p)}) dp} \quad (12)$$

The energy is then expressed as $\mathcal{L}$ $$E(\phi) = \int_{\Omega_\chi} \delta\phi(\chi) \int_{\Omega_\rho} \mathcal{L}(\chi,\rho) \cdot [\mathcal{H}_{\phi(\rho)}(I(\rho) - \hat{I}_\chi(\rho(\rho)))^2 + (1 - \mathcal{H}_{\phi(\rho)})(I(\rho) - \upsilon_\chi)^2] d\rho d\chi \quad (13)$$

Finally, a regularization term $E_{cur}(\phi) = \int_{\Omega_\chi} \delta\phi(\chi)\|\nabla\phi(\chi)\|d\chi$, which penalizes the variance in local curve, is added to smooth the contour and weighted by a factor $\xi$. The final energy is defined as $$E_{total}(\phi) = E(\phi) + \xi E_{cur}(\phi) \quad (14)$$

This method can be implemented in three steps: initialization, gradient descent and detecting the stop condition.

For initialization the local maximum intensity point is detected and regarded as the vessel center. A simple region growing method is applied using this point as seed to achieve an initial vessel region where all the interior intensities are greater than a threshold $T_{ini}$. The initial contour $C_{ini}$ is composed of a set of points at the boundary of the initial region.

The iterative gradient descent technique is applied to minimize the defined energy $E_{total}(\phi)$ (which is an example of a cost function) iteratively until the equilibrium stop condition is met. The vessel center point is updated to be the centroid of vessel region at each iteration.

An example equilibrium stop condition is that the variance in the vessel region is very small and less than a threshold $T_{var}$ for 10 iterations.

Determining the Normalisation Point

As discussed above, it has been shown [3] that in a phantom model containing scattering particles, that the Doppler power was proportional to velocity over a range of power from 0 to 35 dB, which, despite being machine setting dependent, was concluded likely to be the case for a range of machines and settings. In any elliptical cross-section of a vessel we would expect that the flow speed, or intensity, I, profile to have the following shape $$I(x, y) = I_{max}\left[1 - \left(\frac{x^2}{a^2} + \frac{y^2}{b^2}\right)^{\frac{\gamma}{2}}\right], \quad (15)$$

where a and b are major and minor axis radii of the cross-section of the vessel, x and y are cartesian coordinates defining the major and minor axes of the vessel, $I_{max}$ is the true (noiseless) maximum intensity within the vessel, and $\gamma$ is a parameter that works to 'flatten' the velocity profile, $\gamma=2$ represents a classic Poiseuille flow profile in a pipe with ellipsoidal cross-section and increasing $\gamma>2$ allows for the flattening of the profile due to the pulsatile nature of flow (particularly in large arteries) [5].

A classical cumulative intensity curve in power Doppler ultrasound imaging calculates the number of pixels/voxels in a region of interest that have intensity less than or equal to a given intensity. The mathematical equivalent of this in an ellipsoidal cross-section of a blood vessel is the area of a blood vessel with intensity less than a given value. If we define a coordinate change to polar coordinates x=ar cos θ, and y=br sin θ, then the definition of intensity becomes $$I(x,y) = I_{max}[1-r^\gamma], \quad (16)$$

And we can calculate the area of the vessel with I<I* (equivalent to the area of the elliptical ring with r>r*) as $$\int_0^{2\pi}\int_{r*}^1 abr\, dr d\theta = 2\pi ab \int_{r*}^1 r\, dr = \pi ab(1-r^{*2}), \quad (17)$$

We are interested in pixel intensity rather than the area of the vessel, so we can make the substitution $$r^* = \left(\frac{I^*}{I_{max}} - 1\right)^{1/\gamma}.$$

So the area of the vessel with I<I* is $$\pi ab\left(1 - \frac{I^*}{I_{max}} - 1\right)^{2/\gamma}. \quad (18)$$

We normalise this value by the total cross-sectional area of the vessel $\pi ab$ to obtain a cumulative probability of intensity of I<I*

$$p(I < I^*) = p(I^*) = 1 - \left(\frac{I^*}{I_{max}} - 1\right)^{2/\gamma}. \quad (19)$$

In the discrete sense calculating p(I*) is exactly the same as calculating a cumulative Doppler power distribution function using:

$$N(I^*) = \sum_{i=0}^{i=I^*} \frac{n(i)}{N_{total}}, \quad (20)$$

where n(i) is number of pixels with power intensity i, $N_{total}$ is the total number of pixels in the region of interest, and N(I*) is the total number of pixels with power intensity <I*.

Theoretically, one can fit discrete data to this curve to estimate both $\gamma$ and $I_{max}$, provided the region of interest is defined as a vessel cross-section. Note that for a parabolic velocity (or intensity) profile, $\gamma=2$, this is a straight line, and this is independent of the aspect ratio of the ellipsoidal cross-section of the blood vessel. We note in many blood vessels within the utero-placental system, size and haemodynamic considerations imply that $\gamma \approx 2$ (this is also confirmed by plotting intensity profiles through the centre of vessel cross-sections in the power Doppler image). This means that fitting both $\gamma$ and $I_{max}$ to data, as required to accurately estimate peak signal in the vessel, will be prone to errors. We therefore propose an alternate 'weighted' cumulative curve that will allow accurate and reliable fitting of both $\gamma$ and $I_{max}$ for vessels, even with $\gamma \approx 2$.

The proposed cumulative curve reflects the total signal in the blood vessel cross-section with intensity I<I*, and is defined in the discrete sense as $$\hat{I}(I^*) = \sum_{i=0}^{i=I^*} \frac{I(i)n(i)}{I_{total}}, \quad (21)$$

where I(i) is the Doppler power intensity at pixel i, and $I_{total}$ is the cumulative total intensity across the entire vessel cross-section.

In integral form (without normalisation by $I_{total}$) this is $$\hat{I}(I^*) = \int_0^{2\pi}\int_{r*}^1 I(r)abr\, dr d\theta \quad (22)$$

$$= 2\pi ab I_{max}\int_{r*}^1 [1 - r^\gamma]r\, dr$$

$$= 2\pi ab I_{max}\int_{r*}^1 [r - r^{\gamma+1}]dr$$

$$= \frac{\pi ab I_{max}}{(\gamma+2)}(\gamma - r^{*2}(\gamma+2-2r^{*\gamma}))$$

$$= \pi ab \frac{I_{max}}{\gamma+2}\left[\gamma - \left(\frac{I^*}{I_{max}} - 1\right)^{\frac{2}{\gamma}}\left(\gamma+2-2\left(\frac{I^*}{I_{max}} - 1\right)\right)\right]$$

Finally we normalise by $$I_{total} = 2\pi ab\frac{I_{max}}{\gamma+2}\gamma$$

and $$\hat{I}(I^*) = \frac{1}{\gamma+1}\left[\gamma+1-\left(\frac{I^*}{I_{max}} - 1\right)^{\frac{2}{\gamma}}\left(\gamma+2-2\left(\frac{I^*}{I_{max}} - 1\right)\right)\right], \quad (23)$$

This provides an appropriate cumulative curve to which we can fit two parameters, maximum power intensity, $I_{max}$, and 'flatness' $\gamma$.

Similar equations in polar coordinates can be derived for blood vessels with arbitrary cross-section.

The normalisation point is determined by separating out high shear vessel margins (with few red blood cells) and the red blood cell dense vessel itself using a concept of a 'shear threshold'. Shear is determined as the gradient of flow velocity and its peak value at the wall of the blood vessel. The intensity at which shear is X % of its maximum value is defined by calculating the gradient of equation (15), and substituting 'radius' for intensity, as $$I_{norm} = I_{max}\left(1 - \left[\frac{X}{100}\right]^{\gamma/(\gamma+1)}\right). \tag{24}$$

For a practical implementation, the following steps are performed:
1. The intensity weighted Doppler power cumulative distribution is calculated using equation (21).
2. Equation (23) is fit to the cumulative distribution to provide best fit values for $\gamma$ and $I_{max}$
3. These best fit values are in equation (24) to calculate $I_{norm}$. The appropriate value of X may be variable depending on the size and velocity profile in the normalisation vessel (a renal artery will be expected to have a flatter velocity profile than a utero-placental artery). However, for relatively small vessels such as utero-placental arteries, flow profiles are typically parabolic and so X=85 is an appropriate threshold that retains vessel cross-sections away from the high-shear vessel wall.

In tests based on synthetic data, the above method was able to reliably and consistently predict a standardisation value close to the theoretical ideal for reference blood vessels with radius >1 mm. An automated implementation of Rubin's method [15] over the same images shows that the method is sensitive to both reference vessel radius (relative to ROI size) and SNR. This is in part because Rubin's method is designed to be applied to an ROI with tissue, a distributed tissue vasculature, and a large 'reference vessel', and so this is not an unexpected result. With high SNR the relatively large error bars appear because to apply Rubin's method there must be an identifiable 'knee' in the cumulative intensity curves. When the cumulative curve is relatively straight, the knee point becomes difficult for an automated algorithm to determine (or does not exist), and Rubin's method can return artificially high or low standardisation points for this reason.

Until now however, there has been no way to fully automate identification of a single blood vessel within a tortuous network of vessels such as is seen in the placental bed. An embodiment can automatically identify the placenta from a 3D power Doppler Ultrasound scan (3D-PD USS) and identify relevant anatomical landmarks including the utero-placental interface (UPI), as described above. With the 3D-PD signal overlaid the network of blood vessels of the placental bed is automatically mapped and measured. From the network of blood vessels in the placental bed a large (diameter>3 mm) vessel located in the myometrium approximately 1 cm (+/−0.5 cm) from the UPI is identified. It is also possible to use a vessel at a different location however it is normally expected to find a suitable vessel at or near that location. This should be a radial artery as they are the largest vessel in this part of the utero-myometrial vascular network at this anatomical location. Radial arteries rapidly dilate in pregnancy and in the term placenta, have a larger diameter than the uterine arteries which supply them, a very uncommon feature in a vascular network. As this vessel is large enough it can be assumed to have 100% vascularity therefore, with none or minimal tissue attenuation it should have a PD voxel value of around 250. The actual numerical value recorded for voxels in this single vessel (the standardisation value) is used to correct for the unique amount of tissue attenuation the signal has undergone in each individual patient. This enables appropriate quantitative comparison of organ perfusion between women despite different depths of the target organ e.g. posterior/anterior placentas or different amounts of abdominal adiposity or different types of tissue e.g. presence of scar tissue.

The present invention thereby enables calculation of fully automated single vessel 3D-FMBV to be performed. The described techniques can be extended to identify automatically other potential vascular markers in the utero-placental vascular plexus (for example length or diameter of the radial arteries) which are expected to be useful imaging biomarkers for adverse pregnancy outcomes. Embodiments of the present invention can also be adapted to measure any vascular organ or lesion which can be segmented. Examples include kidneys, liver (including fetal), fetal brain, adult ovaries, endometrium during IVF, and any soft tissue tumour which can be examined by ultrasound. The fCNN used for segmentation and identification of landmarks can be trained using transfer learning to minimise the amount of manually labelled training data.

Figure 10:
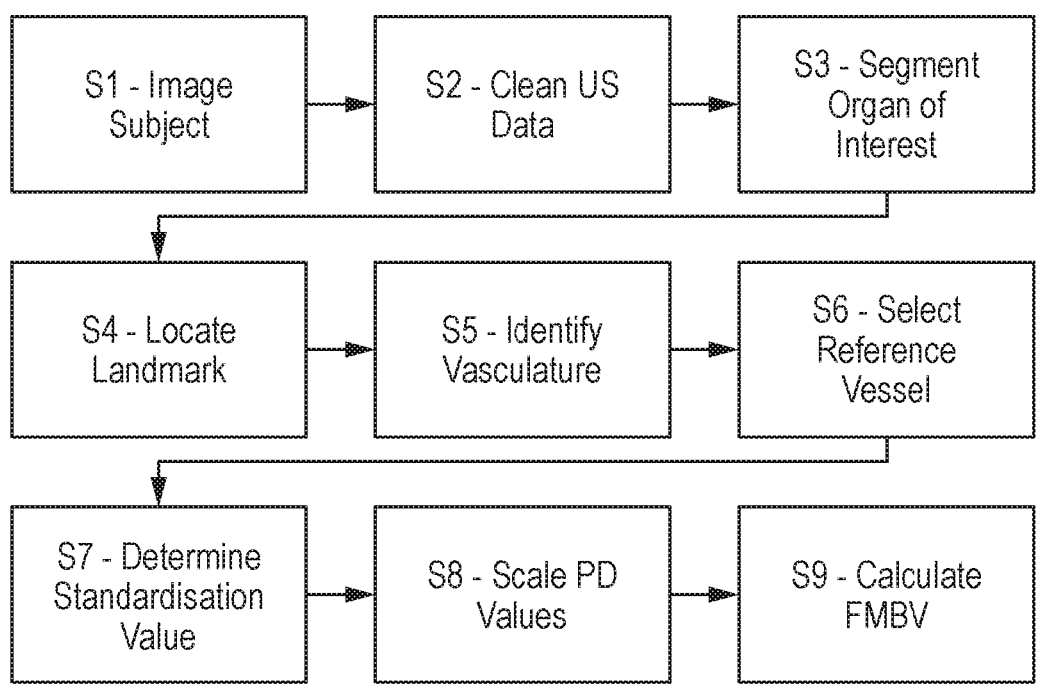
FIG. 10 is a flow chart of a method according to the invention.

FIG. 10 is a flow diagram summarising a process according to an embodiment of the invention. The process comprises:
S1—obtaining image data of a subject, e.g. by performing an ultrasound scan
S2—optionally cleaning up the ultrasound data to remove noise and artefacts
S3—segment the ultrasound data to identify the organ of interest and distinguish it from adjacent tissue
S4—locate a predetermined anatomical landmark, e.g. the interface between the organ of interest and a specific adjacent organ
S5—identify the vasculature within and/or in the vicinity of the organ of interest
S6—select a reference vessel in or in the vicinity of the organ of interest
S7—determine a reference power Doppler value or standardisation value from the reference vessel
S8—apply a scaling function (e.g. linear) to power Doppler values in the ultrasound image based on the power Doppler value of the reference vessel
S9—calculate fractional moving blood volume values from the scaled power Doppler values.

Removal of Inevitable Ultrasound Artefacts

Doppler US image quality is influenced by many factors, e.g. parameter setting, cardiac cycle, and tissue motion. Cardiac cycle may induce periodic artefacts resulting in the disconnection of the vessel segments. 'Flash' artefacts are caused by motion (often fetal movements) and can produce false flow signals leading to inaccurate estimation of perfusion. Detection and removal of these artefacts are desirable pre-processing steps to improve accuracy for estimates of vascularity including 3D-FMBV.

Figure 7A:
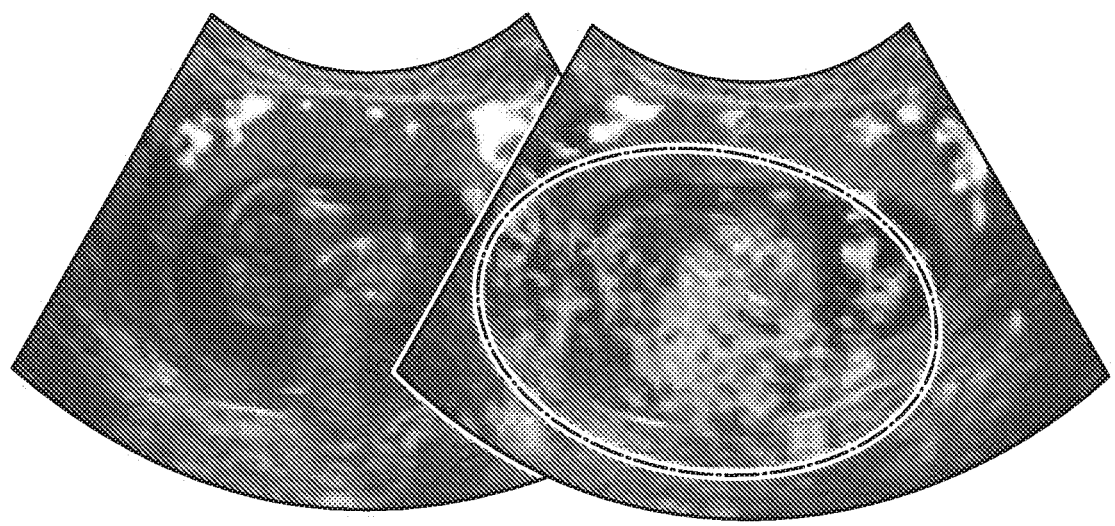
FIG. 7a depicts flash artefact and FIG. 7b depicts average Doppler signal intensity over scan planes.
Figure 7B:
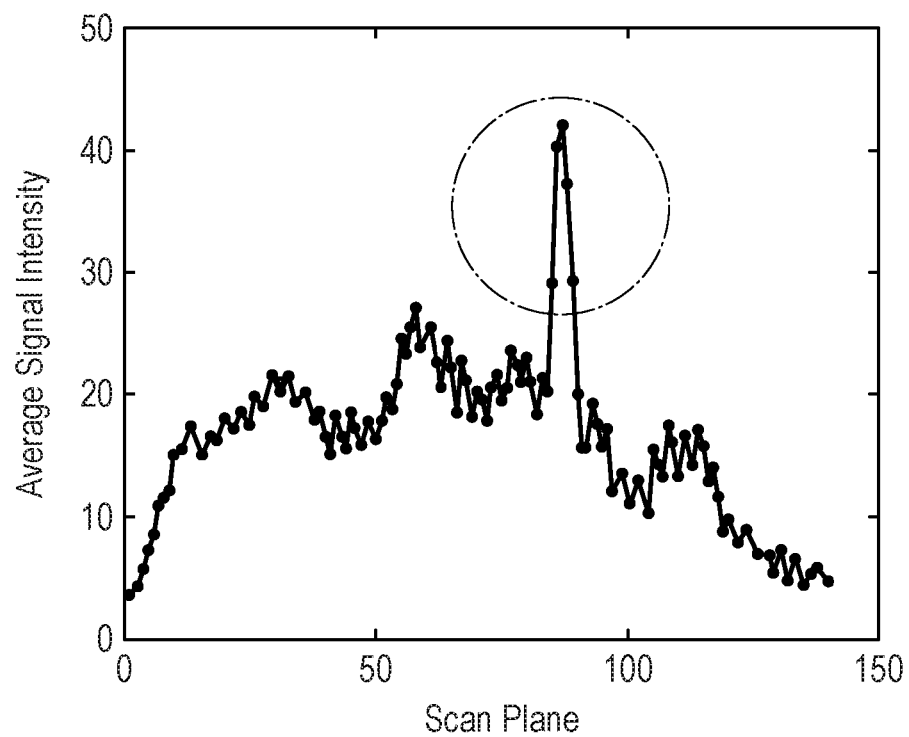

'Flash' artefact appears in stationary tissue if there are large movements of tissue, fluid or rapid transducer movement. It is mostly due to fetal movements and appears as sudden burst of random PD signal in few scan planes, the adjacent planes are not affected (FIG. 7a). It is easily identified by eye. In literature, the images showing 'flash' artefacts are usually categorized into low-quality image and excluded from the dataset for further analysis. It is proposed to detect the flash artefact automatically by comparing the mean signal intensities of different planes (marked by red circle in FIG. 7b). The identified planes can then potentially be replaced by adjacent planes.

Existing 'flash' artefact suppression methods have been designed for 2D US. The 2D method uses information from temporal serial frames to identify and remove the artefacts on the premise that the signal intensity should be consistent among different time frames. The information from adjacent planes will then be used to suppress the 'flash' artefacts seen in the planes with abrupt change in the average intensity (FIG. 7b) based on the fact that the signal intensity should vary smoothly between adjacent scan planes. For 3D-PD US scans it is proposed to apply interpolation from the closest clear neighbour planes to generate new planes to replace those with 'flash' artefacts. Estimates of perfusion can be calculated before and after the processing to assess the affect such artefacts have on quantitative estimates of perfusion (3D-FMBV).

Figure 8A:
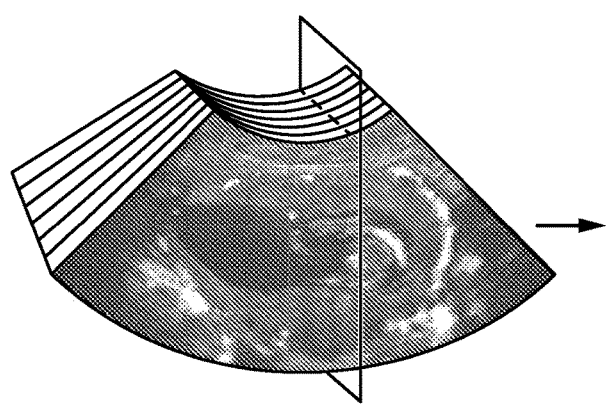
FIG. 8a depicts B-mode ultrasound scan overlaid by power Doppler signal exhibiting periodic noise.
Figure 8B:
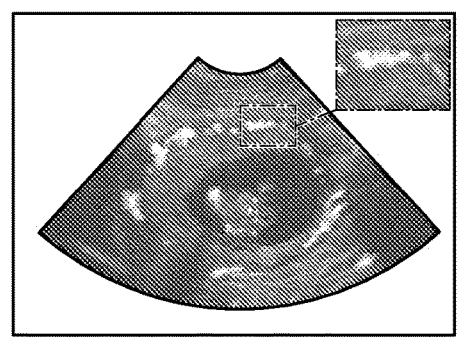
FIG. 8b is a side view and FIG. 8c depicts a linear kernel.

Periodic noise exists in the 3D ultrasound volume as dark streaks in PD signals (FIG. 8b). During the cardiac cycle, the velocity of blood flow changes periodically. The mismatch between the frequency of the sweeping of the scan plane and the heart rate can cause the variance of signal intensities within a same vessel segment caught by different scanning planes resulting in the appearance of dark stripes in the 3D vessel.

Figure 8C:
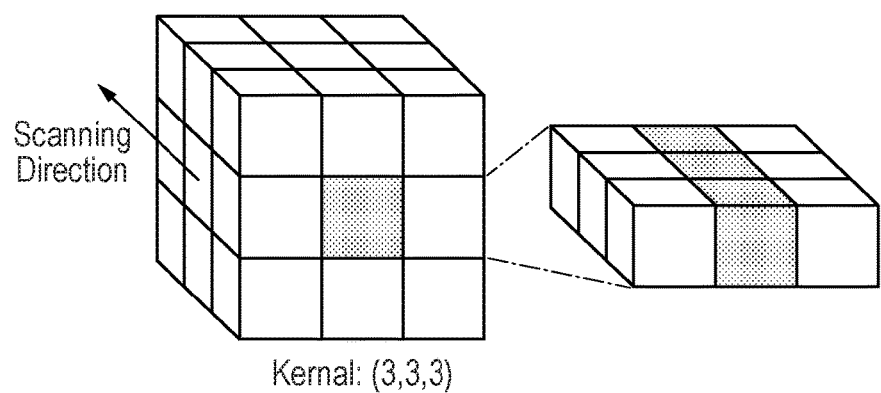

Preliminary data has demonstrated that performing linear smoothing between adjacent scan planes has promising results in removal of the periodic noise. In toroidal space, a linear kernel was defined (FIG. 8c) and applied to the 3D-PD image in toroidal space. The filtered image can then be converted to Cartesian space by our KretzConverter [17].

Figure 9:
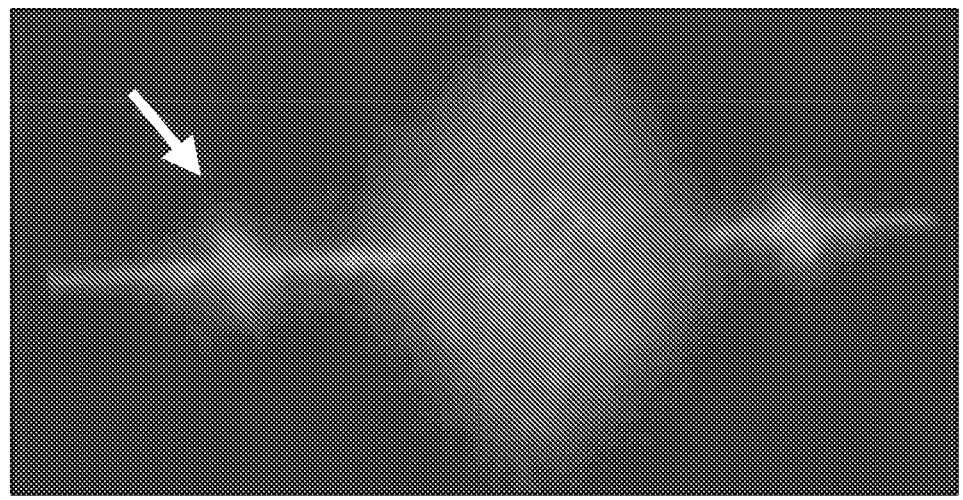
FIG. 9 depicts a 3D Fast Fourier Transform of 3D-US data exhibiting periodic noise.

It is proposed to use 3D Fourier transform to identify and remove the periodic noise caused by the cardiac cycle. The toroidal power Doppler image is converted to frequency domain by 3D FFT (Fast Fourier Transform). Periodic noise is observed to produce Fourier spikes in frequency domain as shown in FIG. 9. A notch filter is applied to remove the detected spikes [18]. The data is then transformed back to spatial domain by 3D Inverse Fourier Transform.

CONCLUSION

The methods of the present invention may be performed by computer systems comprising one or more computers. A computer used to implement the invention may comprise one or more processors, including general purpose CPUs, graphical processing units (GPUs), tensor processing units (TPU) or other specialised processors. A computer used to implement the invention may be physical or virtual. A computer used to implement the invention may be a server, a client or a workstation. Multiple computers used to implement the invention may be distributed and interconnected via a network such as a local area network (LAN) or wide area network (WAN). Individual steps of the method may be carried out by a computer system but not necessarily the same computer system. Results of a method of the invention may be displayed to a user or stored in any suitable storage medium. The present invention may be embodied in a non-transitory computer-readable storage medium that stores instructions to carry out a method of the invention.

The present invention may be embodied in a computer system comprising one or more processors and memory or storage storing instructions to carry out a method of the invention. The present invention may be incorporated into an ultrasound scanner or into software updates or add-ons for such a device.

Having described the invention it will be appreciated that variations may be made on the above described embodiments which are not intended to be limiting. The invention has been described in relation to scanning of female human subjects. It will be appreciated that the invention may also be applied to males and to other animals. The invention is defined in the appended claims and their equivalents.

REFERENCES

[1] J. Rubin et al, "Normalizing fractional moving blood volume estimate with power Doppler US: Defining a stable intravascular point within the cumulative power distribution function. Radiology," vol. 205, pp. 757-765, 1997.

[2] A. Welsh et al, "Inapplicability of fractional moving blood volume technique to standardize Virtual Organ Computer-aided AnaLysis indices for quantified three-dimensional power Doppler.," *Ultrasound Obstet Gynecol*, vol. 40, pp. 688-692., 2012.

[3] T. Jansson, E. Hernandez-Andrade, G. Lingman and K. Maršál, "Estimation of fractional moving blood volume in fetal lung using power Doppler ultrasound: Methodological aspects.," *Ultrasound Med Biol*, vol. 29, pp. 1551-1559, 2003.

[4] N. A. Smith and P. J. Hunter, "An anatomically based model of transient coronary blood flow in the heart," *SIAM Journal on Applied mathematics, vol. 62(3)*, pp. 990-1018, 2002.

[5] P. Looney, G. N. Stevenson, K. H. Nicholaides, W. Plasencius, S. Natsis and S. L. Collins, "Fully automated, real-time 3D ultrasound segmentation to estimate first trimester placental volume using deep learning," *JCI insights* 2018; 3:e120178..

[6] G. N. Stevenson, S. L. Collins, J. Ding, L. Impey and J. A. Noble, "3-D Ultrasound Segmentation of the Placenta Using the Random Walker Algorithm: Reliability and Agreement," *Ultrasound Med Biol*, Vols. 3182-93, p. 41, 2015.

[7] O. Ronneberger, F. P and T. Brox, "U-Net: Convolutional Networks for Biomedical Image Segmentation," in *International Conference on Medical Image Computing and Computer-Assisted Intervention*, 2015.

[8] A. W. Welsh, J. B. Fowlkes, S. Z. Pinter and et al, "Three-dimensional US Fractional Moving Blood Volume: Validation of Renal Perfusion Quantification," *Radiology*, vol. 293, pp. 460-68, 2019.

[9] S. L. Collins, G. N. Stevenson, J. A. Noble and L. Impey, "Utero-placental interface vascularity in early pregnancy estimated by 3D fractional moving blood volume (3D FMBV) predicts fetal growth restriction," *Ultrasound Obstet Gynecol*, vol. 40, p. 119, 2012.

[10] T. C. Lee, R. L. Kashyap and C. N. Chu, "Building Skeleton Models via 3-D Medial Surface Axis Thinning Algorithms. CVGIP: Graphical Models and Image Processing," vol. 56, pp. 462-78, 1994.

[11] A. Videla, C.-L. Lin and J. D. Miller, "Watershed Functions Applied to a 3D Image Segmentation Problem for the Analysis of Packed Particle Beds," *Particle & Particle Systems Characterization*, vol. 23, pp. 237-45, 2006.

[12] Z. Wangmeng et al, "Combination of polar edge detection and active contour model for automated tongue segmentation," *Third International Conference on Image and Graphics* (ICIG'04), 2004.

[13] C. I. Collewet, "Polar snakes: A fast and robust parametric active contour mode," 2009 *16th IEEE International Conference on Image Processing (ICIP)*, 2009.

[14] T. F. Chan and L. A. Vese, "Active contours without edges," *IEEE Transactions on Image Processing*, vol. 10(2):, pp. 266-277, 2001..

[15] J. M. Rubin, R. S. Adler and J. B. Fowlkes et al, "Fractional moving blood volume: estimation with power Doppler," *US. Radiology*, vol. 197, pp. 183-90., 1995;.

[16] P.-L. Yen, H.-K. Wu and H.-S. Tseng et al, "Vascular morphologic information of three-dimensional power Doppler ultrasound is valuable in the classification of breast lesions," *Clinical Imaging*, vol. 36, pp. 267-71, 2012.

[17] P. Looney, G. N. Stevenson and S. L. Collins, "3D ultrasound file reading and coordinate transformations," *Journal of Open Source Software*, vol. 4, p. 1063, 2019.

[18] F. Sur, "An a-contrario approach to quasi-periodic noise removal," 2015 *IEEE International Conference on Image Processing (ICIP)*, 2015.

The invention claimed is:

1. The computer-implemented method of automatically identifying a reference vessel in an ultrasound image, the method comprising:
   segmenting the image to identify an organ;
   locating a predetermined anatomical landmark specific to the organ;
   identifying appropriate vasculature for the organ; and
   selecting a reference vessel from the vasculature that has a size within a predetermined size range and a location with a predetermined distance range from the predetermined anatomical landmark.

2. The method according to claim 1 wherein the predetermined size range is greater than 3 mm in diameter.

3. The method according to claim 1 wherein segmenting comprises using a trained fully convolutional neural network.

4. The method according to claim 1 wherein locating comprises using a multi-class transfer learning model.

5. The method according to claim 4 wherein the multi-class transfer learning model comprises two independent pathways, a first pathway having parameters initialised using a segmentation model and a second pathway having parameters initialised using variance scaling.

6. The method according to claim 1 wherein identifying comprises using an automated multi-seed region growing based process.

7. The method according to claim 6 wherein identifying further comprises using a 3D medial axis based thinning process on the output of the growing based process.

8. The method according to claim 1 wherein the organ is the placenta and preferably the anatomical landmark is the utero-placental interface.

9. The method according to claim 8 wherein the predetermined distance range is from about 0.5 cm to about 1.5 cm.

10. The computer-implemented method of mapping blood flow in a power Doppler image of an organ, the method comprising:
    identifying a reference vessel in the power Doppler image using the method of claim 1;
    determining a reference power Doppler value from the reference vessel; and
    scaling power Doppler values in the power Doppler image based on the reference power Doppler value to obtain a standardised image of blood flow.

11. The method according to claim 10 wherein determining comprises fitting a model vessel profile to the reference vessel and determining a standardization point not falling within the high shear vessel margins.

12. The method according to claim 11 wherein fitting a model vessel profile comprises detecting a local maximum intensity point and using a region growing method to obtain an initial vessel region where all the interior intensities are greater than a threshold.

13. The method according to claim 12 further comprising applying an iterative gradient descent technique is applied to minimize a cost function.

14. A computer-implemented method of determining fractional moving blood volume in an organ, the method comprising:
    obtaining a power Doppler image of the organ;
    mapping blood flow in the power Doppler image to obtain a standardised image of blood flow using the method of claim 10; and
    determining fractional moving blood volume using the standardised image of blood flow.

15. A computer-implemented method of calculating a risk of adverse pregnancy outcomes comprising:
    determining fractional moving blood volume in the placenta of a subject according to the method of claim 14;
    measuring placental volume of the subject; and
    calculating a risk score based at least in part on the fractional moving blood volume and the placental volume.

16. A non-transitory computer readable medium comprising instructions that, when executed by a computer system, instruct the computer system to perform a method of automatically identifying a reference vessel in an ultrasound image, the method comprising:
    segmenting image to identify an organ;
    locating a predetermined anatomical landmark specific to the organ;
    identifying appropriate vasculature for the organ; and
        selecting a reference vessel from the vasculature that has a size within a predetermined size range and a location with a predetermined distance range from the determined anatomical landmark.

17. An ultrasound scanner including a computer control system configured to perform a method of automatically identifying a reference vessel in an ultrasound image, the method comprising:
    segmenting the image to identify an organ;
    locating a predetermined anatomical landmark specific to the organ;
    identifying appropriate vasculature for the organ; and
        selecting a reference vessel from the vasculature that has a size within a predetermined size range and a location with a predetermined distance range from the predetermined anatomical landmark.

* * * * *